United States Patent
Kokura

(10) Patent No.: US 9,958,626 B2
(45) Date of Patent: May 1, 2018

(54) OPTICAL FIBER RIBBON, AND OPTICAL-FIBER-RIBBON PRODUCTION METHOD

(71) Applicant: FURUKAWA ELECTRIC CO., LTD., Tokyo (JP)

(72) Inventor: Kunio Kokura, Tokyo (JP)

(73) Assignee: FURUKAWA ELECTRIC CO., LTD., Tokyo (JP)

(*) Notice: Subject to any disclaimer, the term of this patent is extended or adjusted under 35 U.S.C. 154(b) by 0 days. days.

(21) Appl. No.: 15/513,902

(22) PCT Filed: Sep. 24, 2015

(86) PCT No.: PCT/JP2015/076856
§ 371 (c)(1),
(2) Date: Mar. 23, 2017

(87) PCT Pub. No.: WO2016/047658
PCT Pub. Date: Mar. 31, 2016

(65) Prior Publication Data
US 2017/0299830 A1   Oct. 19, 2017

(30) Foreign Application Priority Data
Sep. 24, 2014   (JP) .................................. 2014-193628

(51) Int. Cl.
*G02B 6/44* (2006.01)
*G02B 6/02* (2006.01)
(Continued)

(52) U.S. Cl.
CPC .............. *G02B 6/4404* (2013.01); *G01J 1/42* (2013.01); *G01M 11/30* (2013.01); *G02B 6/02042* (2013.01); *G02B 6/448* (2013.01)

(58) Field of Classification Search
CPC .. G02B 6/4404; G02B 6/02042; G02B 6/448; G01J 1/42; G01M 11/30
See application file for complete search history.

(56) References Cited

U.S. PATENT DOCUMENTS

2015/0016791 A1* 1/2015 Nagashima .......... G02B 6/4403
385/120

FOREIGN PATENT DOCUMENTS

JP   S57-164707U U   10/1982
JP   S60-213904 A   10/1985
(Continued)

OTHER PUBLICATIONS

International Search Report issued in PCT/JP2015/076856 dated Nov. 17, 2015.
(Continued)

*Primary Examiner* — John M Bedtelyon
(74) *Attorney, Agent, or Firm* — Marshall, Gerstein & Borun LLP

(57) ABSTRACT

Multi-core fibers are optical fibers each of which has a circular cross section. In each of the multi-core fibers, a plurality of cores are arranged at a prescribed interval, the peripheries thereof are covered by a cladding, and a resin coating is formed on the outer periphery of the cladding. In a cross section of this optical fiber ribbon, said cross section being orthogonal to the length direction, the multi-core fibers are arranged such that the cores of all of the multi-core fibers are all arranged in the same direction. The multi-core fibers are arranged such that central lines of the respective multi-core fibers, said central lines respectively linking three of the cores, all face the thickness direction of the optical fiber ribbon. Furthermore, in the optical fiber ribbon, the
(Continued)

arrangement of the cores is substantially constant along the entire length of the optical fiber ribbon in the length direction.

7 Claims, 11 Drawing Sheets

(51) Int. Cl.
*G01M 11/00* (2006.01)
*G01J 1/42* (2006.01)

(56) References Cited

FOREIGN PATENT DOCUMENTS

| | | |
|---|---|---|
| JP | 2003-344731 A | 12/2003 |
| JP | 2011-170099 A | 9/2011 |
| JP | 2013-160800 A | 8/2013 |

OTHER PUBLICATIONS

Written Opinion issued in PCT/JP2015/076856 dated Nov. 17, 2015.
Office Action issued in Japanese Patent Application No. 2016-512161 dated Jun. 30, 2016.
Decision to Grant a Patent issued in Japanese Pat. Application No. 2016-512161 dated Oct. 12, 2016.

\* cited by examiner

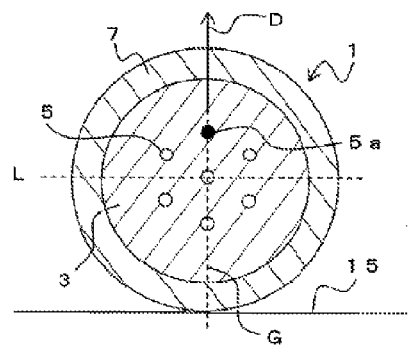
FIG. 5(a)
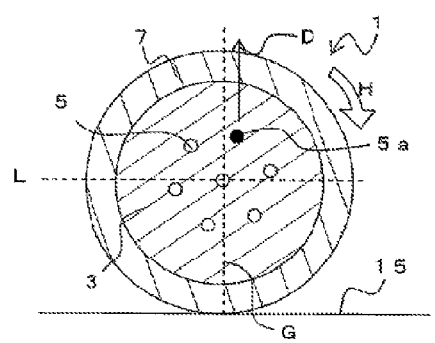
FIG. 5(b)
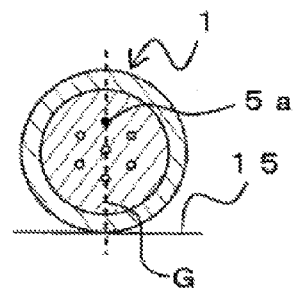
FIG. 6(a)
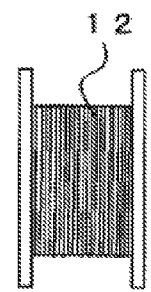
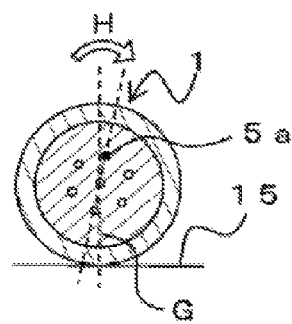
FIG. 6(b)
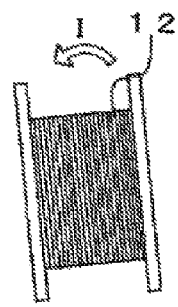

OPTICAL FIBER RIBBON, AND OPTICAL-FIBER-RIBBON PRODUCTION METHOD

TECHNICAL FIELD

This disclosure relates to an optical fiber ribbon in which a plurality of optical fibers are arranged in parallel, and the like.

BACKGROUND

Due to rapidly increasing traffic in optical communications in recent years, the transmission capacity of presently used single-core optical fibers is approaching its limit. So, as a means to further expand the communication capacity, multicore fibers in which a plurality of cores are formed in one fiber have been proposed. Use of multi-core fibers can suppress the laying cost of optical fibers and expand the transmission capacity.

When a multi-core fiber is used as a transmission path, each of the core parts of the multicore fiber needs to be connected to another multi-core fiber, an optical element, or the like respectively to send and/or receive transmission signals. An optical fiber ribbon, in particular, including a plurality of such multi-core fibers arranged in parallel can easily connect a plurality of multi-core fibers collectively.

On the other hand, a multi-core fiber has cores arranged at positions other than the center of the cross section, and this leads to a problem that the connection thereof is more difficult compared to connection of single-core fibers.

Thus, for an optical fiber ribbon having a plurality of such multi-core fibers arranged in parallel, it is preferable that the arrangement of the cores of each of the multi-core fibers is aligned in a particular direction.

As a method for specifying the core arrangement in a multi-core fiber, Japanese Unexamined Patent Application Publication No. 2011-170099 (JP-A-2011-170099) discloses a multi-core fiber provided with a marker on a cladding thereof for identifying core arrangements.

In addition, it has been expected to reduce connection loss in connecting optical fiber ribbons together or in connecting an optical fiber ribbon with a light element or the like. To reduce the connection loss, it is required to further reduce shifting of axes of cores, and thus it is preferable that optical fibers in an optical fiber ribbon are aligned so that the eccentric direction of cores of each of the optical fibers is in one fixed direction.

However, even with the optical fibers disclosed in Patent Document 1 in which the core arrangement is identifiable on its cross section, it is still difficult to form an optical fiber ribbon by aligning the optical fibers with cores of each of the optical fibers arranged in a particular direction.

SUMMARY OF THE DISCLOSURE

The presently described embodiments were achieved in view of such problems. Its object is to provide an optical fiber ribbon or the like in which cores of each of the optical fibers are in predetermined arrangement over the longitudinal direction of the optical fiber ribbon.

To achieve the above object, a first set of embodiments is an optical fiber ribbon including a plurality of optical fibers that are arranged in parallel. A form of a cross section of the optical fiber taken in a perpendicular direction to a longitudinal direction thereof has an orientation in a rotational direction with the longitudinal direction of the optical fiber as an axis. Cores of each of the optical fibers are arranged at a fixed position respectively over the longitudinal direction on a cross section taken in a perpendicular direction to a longitudinal direction of the optical fiber ribbon.

Preferably, cores of each of the optical fibers are arranged at a fixed position respectively over the entire length of the optical fiber ribbon on a cross section taken in a perpendicular direction to the longitudinal direction of the optical fiber ribbon.

Preferably, the optical fiber has a circular cross section.

The optical fiber may be a multi-core fiber that has a plurality of cores.

A plurality of the optical fibers have the same core arrangement in regard with an outer shape of the optical fiber on a cross section perpendicular to the longitudinal direction thereof and the optical fibers may be disposed in such a manner that all the core arrangements of the optical fibers are the same.

A plurality of the optical fibers have the same core arrangement in regard with an outer shape of the optical fiber on a cross section perpendicular to the longitudinal direction thereof and the optical fibers may be disposed in such a manner that the core arrangement of some of the optical fibers and the cores arrangement of the other optical fibers are 90 degrees rotated from each other with the respective longitudinal direction of the optical fiber as an axis of rotation.

According to the first set of embodiments, even when a form of a cross section of the optical fiber has an orientation in a rotational direction with the longitudinal direction of the optical fiber as an axis, cores of each of the optical fibers are arranged at a fixed position respectively over a longitudinal direction of the optical fiber ribbon for at least in a predetermined length range, and thus connection of the optical fiber ribbon is easy.

In particular, arranging optical fibers so that the cores are arranged at predetermined positions on the cross sections over the entire length of the optical fiber ribbon further facilitates to connect the optical fiber ribbons collectively.

Also, if the cross section of the optical fiber is circular, it is unnecessary to make the optical fiber non-circular, excelling in manufacturability.

Also, a multi-core fiber is applicable as an optical fiber for the present embodiments, for example.

Also, all the optical fibers may be arranged in the same direction, or the optical fibers may be arranged so as to be perpendicular to each other.

A second set of embodiments is a method of producing an optical fiber ribbon in which a plurality of optical fibers are arranged in parallel. A form of a cross section of the optical fiber taken in a perpendicular direction to a longitudinal direction thereof has an orientation in a rotational direction with the longitudinal direction of the optical fiber as an axis. The method includes a light introducing step which introduces light into a core of the fiber, a light leaking step which leaks the light introduced into the core outside the optical fiber, a light detecting step which detects the light leaked in the light leaking step, an optical-fiber rotating step which rotates the optical fiber in a circumferential direction thereof so as to maintain the leaked light detected in the light detecting step to be substantially constant, and a coating step which coats the optical fibers together to make an optical fiber ribbon.

In the light introducing step, light may be introduced from a bent portion of the bent optical fiber.

In the light introducing step, light may be introduced from an end of the optical fiber.

The optical-fiber rotating step may rotate the optical fiber in its circumferential direction by tilting a rotational surface of a bobbin that reels out the optical fiber.

The optical-fiber rotating step may rotate the optical fiber in its circumferential direction by tilting a rotational surface of a roller which is disposed either in front or rear of a detector that detects leak of light in the light detecting step.

Preferably, the optical fiber has a circular cross section.

The optical fiber may be a multi-core fiber having a plurality of cores.

According to the second set of embodiments, an optical fiber ribbon in which the core arrangement of the optical fibers is substantially uniform over the entire length of the optical fiber ribbon in its longitudinal direction can be formed.

Also, if the light introducing part is a bent portion, light can be introduced into an optical fiber in the proximity of an optical detector.

Also, if the light introducing part is an end of an optical fiber, light can be introduced into a freely selected specific core.

Also, the optical fiber can be easily twisted by rotating a bobbin, which reels out the optical fiber, with a direction in which the optical fiber is reeled out as an axis of rotation. Thus, twisting the optical fiber according to the intensity of the light detected in the optical detector can easily control particular cores of the optical fibers to be at fixed positions.

Also, such effects can be obtained by rotating a roller disposed either in front or rear of a bent portion of the optical fiber with a travelling direction of the optical fiber as an axis of rotation.

Also, if the cross section of the optical fiber is circular, it is unnecessary to make the optical fiber non-circular, which excels in manufacturability.

Also, a multi-core fiber is applicable as an optical fiber for the present embodiments, for example.

The present embodiments can provide an optical fiber ribbon or the like, in which cores of each of the optical fibers are in predetermined arrangement over the longitudinal direction of the optical fiber ribbon, and which excels in connectivity.

BRIEF DESCRIPTION OF DRAWINGS

FIG. 5 (a) is a cross sectional view of E section taken along the line F-F in FIG. 4 showing a light introducing core 5a being positioned at the top of a perpendicular line G of a bent portion 15 of the optical fiber.

FIG. 5 (b) is a cross sectional view of E section taken along the line F-F in FIG. 4 showing the light introducing core 5a being positioned at part which is shifted from the perpendicular line G.

FIG. 6 (b) is a drawing to show a position of the light introducing core 5a on a cross section of the multi-core fiber 1 and a tilt of the bobbin 12, in which the light introducing core 5a lies on a position shifted from the perpendicular line G.

FIG. 6 (c) is a drawing to show a position of the light introducing core 5a on a cross section of the multi-core fiber 1 and a tilt of the bobbin 12, in which the light introducing core 5a lies on a position shifted from the perpendicular line G.

FIG. 7 is a side view showing an optical fiber ribbon producing apparatus 20a.

FIG. 8 (b) is a drawing showing an optical fiber ribbon producing apparatus 20c.

FIG. 9 (a) is a drawing showing an optical fiber ribbon 10a.

FIG. 9 (b) is a drawing showing an optical fiber ribbon 10b.

FIG. 9 (c) is a drawing showing an optical fiber ribbon 10c.

FIG. 10 (b) is a drawing showing an optical fiber ribbon 10e.

FIG. 10 (c) is a drawing showing an optical fiber ribbon 10f.

FIG. 11 (b) is a drawing showing an optical fiber ribbon 30a.

DESCRIPTION OF SOME EMBODIMENTS

First Embodiment

Figure 1:
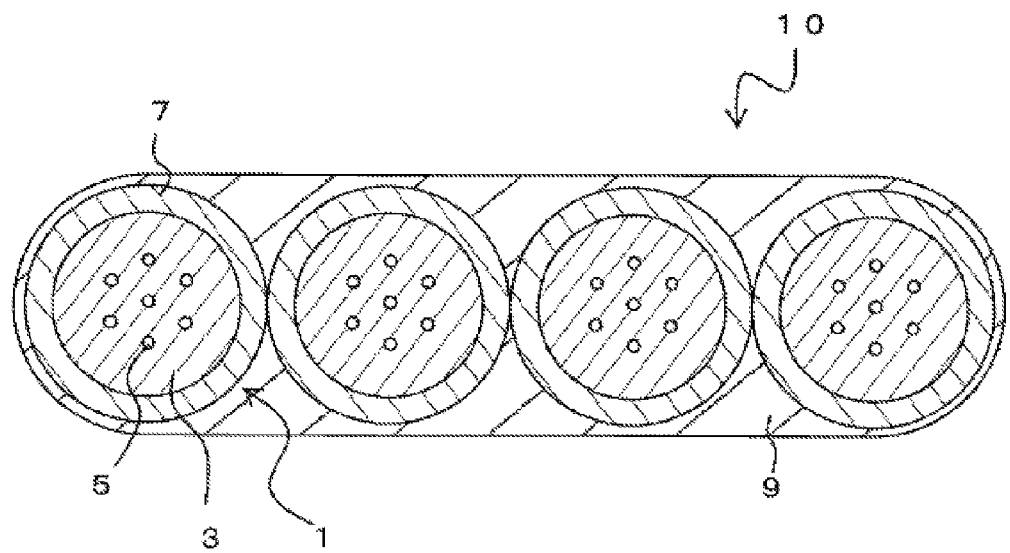
FIG. 1 is a cross sectional view showing an optical fiber ribbon 10.

Hereinafter, an optical fiber ribbon according to an embodiment will be described. FIG. 1 (a) is a cross sectional view of an optical fiber ribbon 10. A plurality of multi-core fibers 1 are arranged in parallel and integrated by a ribbon resin coating 9 to form the optical fiber ribbon 10. The number of the multi-core fibers 1 forming the optical fiber ribbon 10 is not limited to that of the example shown in the drawing.

The multi-core fiber 1 is an optical fiber that has a circular cross section, and includes a plurality of cores 5, which are arranged at predetermined intervals, and a cladding 3, which covers the periphery of the cores 5 and has a refractive index lower than that of a plurality of the cores. A resin coating 7 is formed on the periphery of the cladding 3. The multi-core fiber 1 has total of the seven cores 7, one of which is disposed at the center of the multi-core fiber 1 and the others surrounding the center core, being disposed at each vertices of a regular hexagon. That is, the center core 5 and the other surrounding six cores 5 are all at regular intervals. Also, for the six cores 5, the distance between the adjacent cores 5 is the same. The core 5 becomes a waveguide for signal light. Each of a plurality of the multi-core fibers 1 has the same arrangement of a plurality of cores. Also, the arrangement of the cores 5 is not limited to the example shown in the drawing.

The multi-core fibers 1 are disposed in such a manner that, on every cross section perpendicular to the longitudinal direction of the optical fiber ribbon 10, the cores 5 of all the multi-core fibers 1 are all arranged in the same direction over the longitudinal direction of the optical fiber ribbon 10. For example, in the example shown in the drawing, the multi-core fibers 1 are disposed in such a manner that every one of the center lines of each of the multi-core fibers 1 connecting three of the cores 5 is in the thickness direction of the optical fiber ribbon 10 (the vertical direction in the drawing). Also, in the optical fiber ribbon 10, the cores 5 are arranged at fixed positions over at least a predetermined range of length in the longitudinal direction of the optical fiber ribbon 10. That is, the arrangement of the cores 5 is substantially uniform on any cross section of the optical fiber ribbon 10 for the predetermined range of length in the longitudinal direction thereof. Further preferably, the arrangement of the cores 5 is always substantially uniform over the entire length of the optical fiber ribbon 10.

Figure 2:
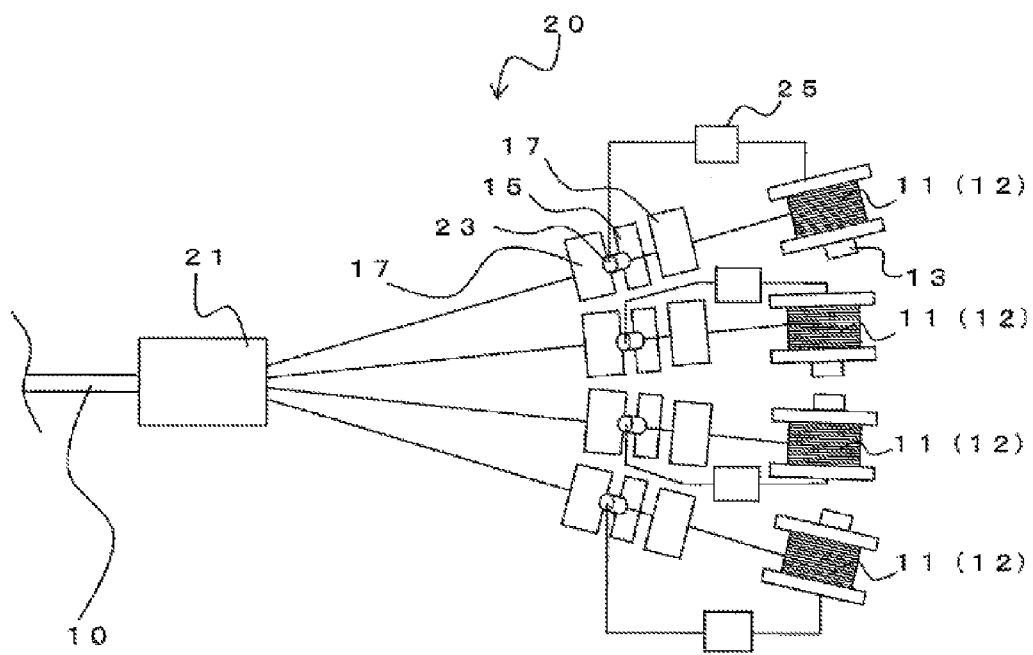
FIG. 2 is a plan view showing an optical-fiber-ribbon producing apparatus 20.
Figure 3:
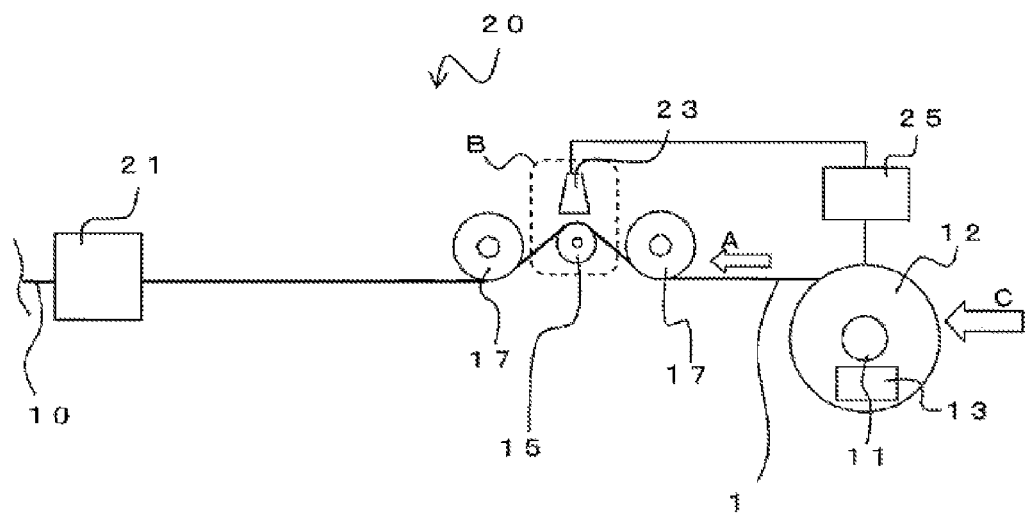
FIG. 3 is a side view showing the optical-fiber-ribbon producing apparatus 20.

Next, a method for producing the optical fiber ribbon 10 will be described. FIG. 2 is a plan view showing an optical fiber ribbon producing apparatus 20 and FIG. 3 is a side view showing the optical fiber ribbon producing apparatus 20. The optical fiber ribbon producing apparatus 20 mainly includes a bobbin mounting part 11, a bobbin controller 25, a guide 17, an optical fiber bending part 15, an optical detector 23, a ribbon resin coater 21, and so on. The number of the bobbin mounting part 11, the bobbin controller 25, the guide 17, the optical fiber bending part 15, and the optical detector 23 disposed is equal to the number of the multi-core fibers 1 forming the optical fiber ribbon 10.

A bobbin 12 is disposed on the bobbin mounting part 11. The multi-core fiber 1 is wound around the bobbin 12, which is a bobbin that reels out the multi-core fiber 1. A light introducing part 13 is provided on the each bobbin mounting part 11. The light introducing part 13 is a light source that introduces light into an end portion of the multi-core fiber 1. Although the light introducing part 13 can introduce light into all cores, it can also introduce light into a particular core only.

The multi-core fiber 1 that is reeled out from the bobbin 12 (an arrow A in the drawing) is sent to the optical fiber bending part 15 which is placed between a pair of the guides 17. The optical fiber bending part 15 is a roller. The multi-core fiber 1 is bent by the roller to have a predetermined curvature while contacting and passing the roller. The guides 17 are rollers guiding the multi-core fiber 1 in a running route so that the multi-core fiber 1 contacts the optical fiber bending part 15 for a predetermined range to be bent.

The optical detector 23 is disposed in the proximity of each of the optical fiber bending parts 15. The optical detector 23 is a sensor that continuously detects light leaked from the multi-core fiber 1. The light intensity of the leaked light is sent to the bobbin controller 25, respectively. The bobbin controller 25 controls the posture of the bobbin 12. The detection of the leaked light by the optical detector 23 and a method of controlling the bobbin 12 thereby will be described later.

The multi-core fiber 1 that has passed the optical fiber bending part 15 then passes through the ribbon resin coater 21. At the ribbon resin coater 21, a plurality of the multi-core fibers 1 are aligned and a ribbon resin coating 9 is applied onto the periphery parts thereof. The ribbon resin coater 21 is, for example, an extruding machine including alignment dies or extrusion dies.

The ribbon resin coating 9 applied by the ribbon resin coater 21 is cured by drying or UV radiation as necessary. The optical fiber ribbon 10, in which a plurality of the multi-core fibers 1 are integrated, is then wound up by a winding apparatus whose drawing is omitted. As above, the optical fiber ribbon 10 is produced.

Figure 4:
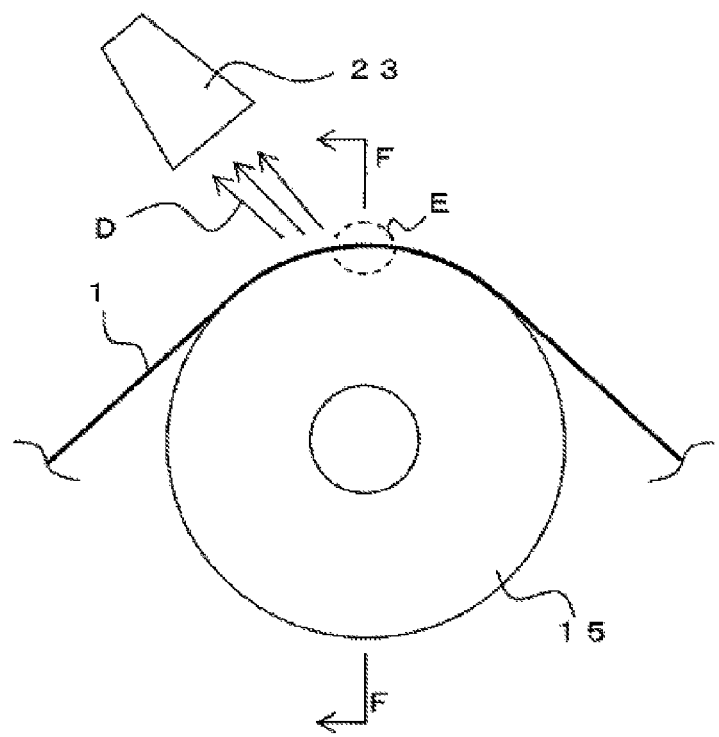
FIG. 4 is a drawing showing the vicinity of an optical detector 23 and is an enlarged view of B section in FIG. 3.

Next, the detection of the leaked light by the optical detector 23 and the method of controlling the bobbin 12 will be described. FIG. 4 is an enlarged view of the vicinity of the optical fiber bending part 15 (an enlarged view of B section in FIG. 3). As mentioned above, the multi-core fiber 1 bends along the optical fiber bending part 15. Also, light is introduced into at least one of the cores 5 of the multi-core fiber 1 by the light introducing part 13 (a light introducing step). Thus, when the multi-core fiber 1 is bent to have a curvature greater than a predetermined curvature, light leaks outside (D in the drawing) according to distortion of the multi-core fiber 1 (a light leaking step). The optical detector 23 detects this leaked light (a light detecting step).

FIG. 5 (a) and FIG. 5 (b) are cross sectional views of E section taken along the line F-F in FIG. 4. FIG. 5 (a) and FIG. 5 (b) show the different positions of a light introducing core 5a. The line G in the drawings is a center line of a cross section perpendicular to the longitudinal direction of the multi-core fiber 1 and is a line that is perpendicular to a roller surface of the optical fiber bending part 15. As mentioned above, although light can be introduced into all the cores 5, for simplification hereinafter, an example in which light is introduced into only the light introducing core 5a shown in the drawings will be described.

In FIG. 5 (a), the upper part above the line L (further away from the optical fiber bending part 15), which is a line that passes through the center core 5 and is parallel to the contacting surface with the optical fiber bending part 15 (i.e. neutral axis), is a tension region caused by bending deformation, and the lower part below the neutral axis L (on the side of the optical fiber bending part 15) is a compressed region caused by bending deformation. That is, FIG. 5 (a) shows a state in which the light introducing core 5a is on the line G and is at the furthermost position from the neutral axis L (the optical fiber bending part 15). Thus, the light introducing core 5a has the largest tension distortion in this state.

When a large distortion is given to the light introducing core 5a, light leaks accordingly (D in the drawing). This leaked light fluctuates corresponding to the amount of distortion, and if the amount of distortion increases, the amount of leaked light also increases. Thus, in the state of FIG. 5 (a), leaked light is at the maximum. The intensity of this leaked light is detected by the optical detector 23.

On the other hand, FIG. 5 (b) is a drawing showing a state in which the light introducing core 5a is positioned at a part shifted from the perpendicular line G. That is, the multi-core fiber 1 is rotated slightly from the position shown in FIG. 5 (a) with the center of the cross section as an axis of rotation (H in the drawing). Hereinafter, the rotation of the multi-core fiber 1 with the center axis thereof as an axis of rotation may be simply called as a rotation of the multi-core fiber 1. In this state, compared to the state shown in FIG. 5 (a), the light introducing core 5a is slightly closer to the neutral axis L. For this reason, the amount of distortion of the light introducing core 5a becomes smaller. As a result, the intensity of the leaked light D decreases.

The rotational direction of the multi-core fiber 1 can be detected with certainty by disposing a plurality of the optical detectors 23 at different positions in the circumferential direction of the multi-core fiber 1 respectively and detecting the leaked light from respective directions, for example.

By detecting the intensity of the light leaked from the light introducing core 5a using the optical detectors 23 in this way, it is possible to know that the light introducing core 5a is in the state shown in FIG. 5 (a) when the intensity of the leaked light is maximum. Also, if the intensity of the leaked light decreases, it is possible to recognize that the multi-core fiber 1 is rotated.

Also, if light is introduced into all cores, the rotation of the multi-core fiber 1 can still be detected by detecting the light leaked from a core. That is, to detect such a rotation, it is preferable to use an outermost core as the light introducing core 5a. In particular, when light is introduced into only a particular core, it is necessary to choose a core other than the center core of the multi-core fiber 1 as a particular core, and it is preferable to introduce light into an outermost core.

Figure 6C:
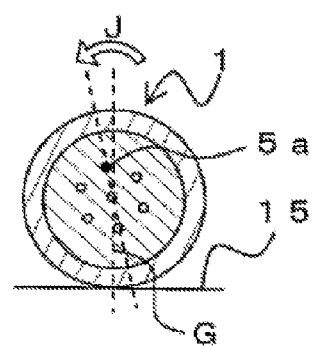
FIG. 6 (a) is a drawing to show a position of the light introducing core 5a on a cross section of a multi-core fiber 1 and a tilt of the bobbin 12, in which the light introducing core 5a lies on the perpendicular line G.
Figure 6C:
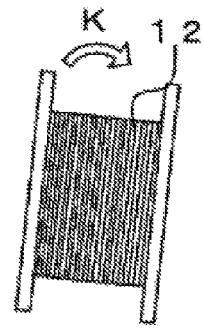

Next, a method for controlling the bobbin mounting part 11 (bobbin 12) will be described. FIG. 6 (a) to FIG. 6 (c) are drawings to show the position of the light introducing core 5a on a cross section of the multi-core fiber 1 and the tilting of the bobbin 12. The drawing on the left side of each of the drawings is a cross sectional view of E section taken along F-F line in FIG. 4, and the drawing on the right side of each of the drawings shows posture of the bobbin 12 viewed in C direction in FIG. 3.

FIG. 6 (a) shows a standard state, in which the light introducing core 5a is on the line G and is at a position furthermost away from the optical fiber bending part 15. In this standard state, the bobbin 12 is maintained in an upright posture. Thus, the multi-core fiber 1 reeled out from the bobbin 12 has the light introducing core 5a positioned at the upper part.

On the other hand, when the intensity of the leaked light detected by the optical detector 23 changes so that the multi-core fiber 1 is found to be rotating, the bobbin controller 25 controls the posture of the bobbin 12. For example, as shown in FIG. 6 (b), when it is recognized that the multi-core fiber 1 is rotated and the position of the core 5 is shifted to the right in the drawing (H in the drawing) with the center of the cross section as an axis, then the bobbin controller 25 tilts the rotational surface of the bobbin 12 in a direction opposite to the rotational direction of the multi-core fiber 1 (I direction in the drawing).

Similarly, as shown in FIG. 6 (c), when it is recognized that the multi-core fiber 1 is rotated and the position of the core 5 is shifted to the left in the drawing (J in the drawing) with the center as an axis, then the bobbin controller 25 tilts the rotational surface of the bobbin 12 in a direction opposite to the rotational direction of the multi-core fiber 1 (K direction in the drawing). That is, the bobbin controller 25 and the bobbin 12 function as an optical fiber rotating part that rotates the multi-core fiber 1. As above, the optical fibers are rotated in the circumferential direction in such a manner that the amount of leaked light detected in the light detecting step is substantially constant (the optical-fiber rotating step).

The tilting angle of the each bobbin 12 is determined according to the rotational angle of the multi-core fiber 1. For example, the rotational angle may be calculated from the intensity of light detected by the optical detector 23 and the bobbin 12 may be tilted for an angle to offset the rotational angle, or, alternatively, the bobbin 12 may be tilted until the intensity of the light leaked detected by the optical detector 23 comes to the maximum standard intensity.

The optical detector 23 detects the leaked light for respective bobbins 12 and the bobbin controller 25 controls the individual posture of each of the bobbins 12. Thus, all the multi-core fibers 1 sent to the ribbon resin coater 21 can be controlled so as to be aligned in the same direction, respectively.

At the ribbon resin coater 21, the multi-core fibers 1 are aligned and the ribbon resin coating 9 is applied to the periphery thereof (the coating step). The ribbon resin coating 9 is applied continuously or intermittently along the longitudinal direction of the optical fiber ribbon 10. Controlling the particular core (the light introducing core 5a) to be always at a predetermined position on the cross section of the optical fiber ribbon 10 as above allows the arrangement of the cores 5 to be substantially uniform over the longitudinal direction of the optical fiber ribbon 10.

Thus, since arrangements of the cores of all the multi-core fibers 1 in the optical fiber ribbon 10 are uniform, alignment is easy when connecting the optical fiber ribbon 10 with other fibers or elements.

As above, according to the present embodiment, the position of the particular core 5 can be always kept at a fixed position on the cross section taken in the diameter direction of the multi-core fiber 1 that is to be sent to the ribbon resin coater 21. Thus, the particular core 5 can be always disposed at a fixed position when being made into a ribbon. For this reason, the arrangements of the cores 5 of all the multi-core fibers 1 can be substantially uniform over at least a predetermined length (or entire length, preferably) of the optical fiber ribbon 10.

Thus, even if unavoidable rotation of the multi-core fiber occurs in manufacturing, the multi-core fibers 1 are made into a ribbon while being twisted offsetting the rotation, so that the core arrangement can be uniform over the longitudinal direction.

As above, an optical fiber ribbon in which the core arrangement is uniform can be obtained, so that it is possible to easily connect a plurality of multi-core fibers collectively by fusion splicing or using a connector.

Second Embodiment

Next, a second embodiment will be described. In the first embodiment, an example in which the light introducing part 13 is at an end of the multi-core fiber 1 was described. With this method, light can be introduced into a selected particular core only. However, another method can be used to introduce light into the multi-core fiber 1.

Figure 7:
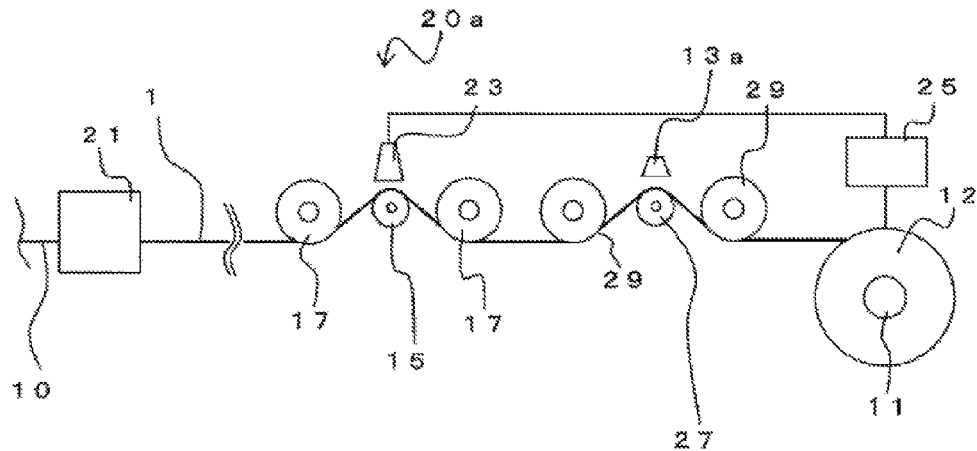

FIG. 7 is a drawing showing an optical fiber ribbon producing apparatus 20a. In the descriptions hereinafter, the same notations will be used for the same compositions as in the optical fiber ribbon producing apparatus 20 and redundant descriptions will be omitted. The optical fiber ribbon producing apparatus 20a is approximately similar to the optical fiber ribbon producing apparatus 20 except for a light introducing part 13a, which substitutes the light introducing part 13.

The light introducing part 13a includes a light-introducing bending portion 27 and a light source between a pair of guides 29. The light-introducing bending portion 27 is a roller that bends the multi-core fiber 1 contacting and passing the roller to have a predetermined curvature. The guides 29 are rollers for guiding the multi-core fiber 1 for a running route so that the multi-core fiber 1 contacts the light-introducing bending portion 27 for a predetermined range to be bent.

The light source disposed in the proximity of the light-introducing bending portion 27 irradiates the multi-core fiber 1 passing over the light-introducing bending portion 27 so that light is introduced from the bent part into the cores inside the multi-core fiber 1. That is, light is introduced into the multi-core fiber 1 by a contrary principle of the light leaking from the optical fiber bending part 15. Some of the light introduced into the multi-core fiber 1 will be detected as the leaked light by the optical detector 23 at the optical fiber bending part 15.

As above, according to the second embodiment, the similar effects as in the first embodiment can also be obtained. At the light introducing part 13a, it is impossible to introduce light into only a particular core and thus light is introduced into a plurality of the cores or almost all the cores. However, even with this method, light can be introduced efficiently into the outermost core, which is furthermost away from the neutral axis, and the leaked light can be detected.

Third Embodiment

Figure 8A:
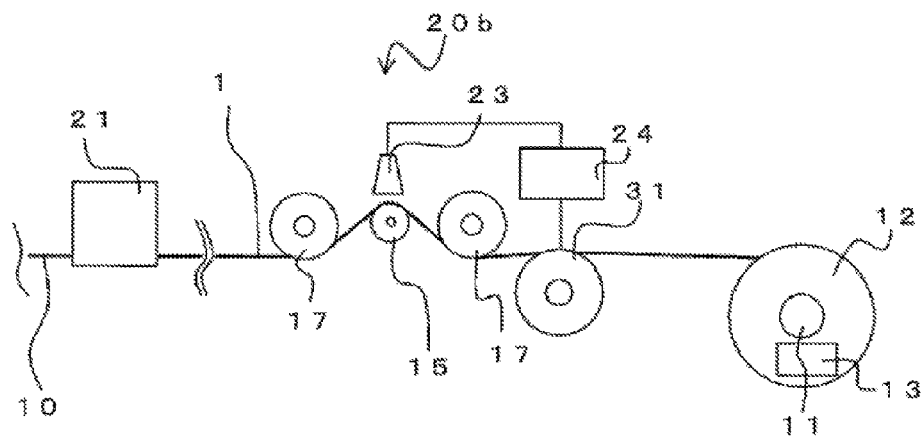
FIG. 8 (a) is a drawing showing an optical fiber ribbon producing apparatus 20b.
Figure 8B:
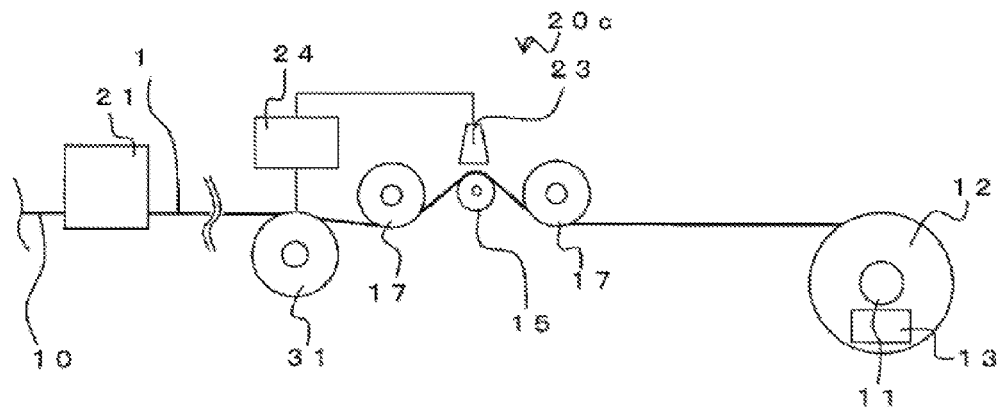

Next, a third embodiment will be described. FIG. 8 (a) is a drawing showing an optical fiber ribbon producing apparatus 20b. The optical fiber ribbon producing apparatus 20b is approximately similar to the optical fiber ribbon producing apparatus 20 except that it is provided with a fiber rotating part 31.

The fiber rotating part 31 is disposed between the bobbin 12 and the optical fiber bending part 15 (the guide 17). The fiber rotating part 31 is, for example, a roller. The multi-core fiber 1 contacts the fiber rotating part 31 for a predetermined range. Thus, predetermined friction force between the multi-core fiber 1 and the fiber rotating part 31 is created.

A rotation controller 24 controls the posture of the fiber rotating part 31 corresponding to the leaked light detected by the optical detector 23. More specifically, a rotational surface of the fiber rotating part 31 is tilted in the same manner as tilting the bobbin as mentioned above. Tilting the fiber rotating part 31 in this direction enables to add rotation to the multi-core fiber 1 contacting and passing the fiber rotating part 31. Thus, it is possible to always maintain the uniform positions of the cores 5 on the cross section perpendicular to the longitudinal direction of the multi-core fiber 1 that is sent to the ribbon resin coater 21.

As above, according to the third embodiment, the similar effects as in the first embodiment can be obtained. In addition, it is only necessary to control the posture of a roller which is smaller compared to the bobbin 12, so controlling is easier.

Fourth Embodiment

Next, a fourth embodiment will be described. FIG. 8 (b) is a drawing showing an optical fiber ribbon producing apparatus 20c. The optical fiber ribbon producing apparatus 20c is approximately similar to the optical fiber ribbon producing apparatus 20b except that the fiber rotating part 31 is provided at a different position.

In the optical fiber ribbon producing apparatus 20c, the fiber rotating part 31 is disposed between the optical fiber bending part 15 (the guide 17) and the ribbon resin coater 21. In this case, an angle of rotation of the fiber rotating part 31 is set according to an angle of rotation of the multi-core fiber 1. For example, the angle of rotation may be calculated from the light intensity detected by the optical detector 23 and the fiber rotating part 31 may be tilted for an angle that offsets the angle of rotation.

As above, according to the fourth embodiment, the similar effects as in the third embodiment can be obtained. In addition, it is possible to control the circumferential position of the multi-core fiber 1 at a part further closer to the ribbon resin coater 21.

First Embodiment of Other Optical Fiber Ribbons

The optical fiber ribbon that is applicable to these embodiments is not limited to the embodiment shown in FIG. 1. For example, as in an optical fiber ribbon 10a shown in FIG. 9 (a), the multi-core fibers 1 may be aligned in a different direction from that of the optical fiber ribbon 10. In the optical fiber ribbon 10a, the multi-core fibers 1 are disposed in such a manner that every center line of each of the multi-core fibers 1 connecting three of the cores 5 is oriented in a width direction (horizontal direction in the drawing) of the optical fiber ribbon 10. That is, in the optical fiber ribbon 10a, all the multi-core fibers 1 are disposed in a direction that is at 90 degrees to the direction in the optical fiber ribbon 10. As above, the direction of the core arrangement of multi-core fibers forming an optical fiber ribbon can be in any direction.

Also, the arrangement of cores of multi-core fibers forming the optical fiber ribbon is not limited to the examples mentioned above. For example, as in an optical fiber ribbon 10b shown in FIG. 9 (b), a multi-core fiber 1a in which the cores 5 are arranged in a row may be used. In this case, the orientation of the arrangement of the cores 5 may be in the width direction of the optical fiber ribbon 10b as shown in the drawing, or, alternatively, the multi-core fibers 1 may be arranged in other orientations such as in a direction perpendicular to the width direction. As above, the arrangement of cores of multi-core fibers forming an optical fiber ribbon is not limited to the examples shown in the drawings and can be in any types of arrangement.

Figure 9A:
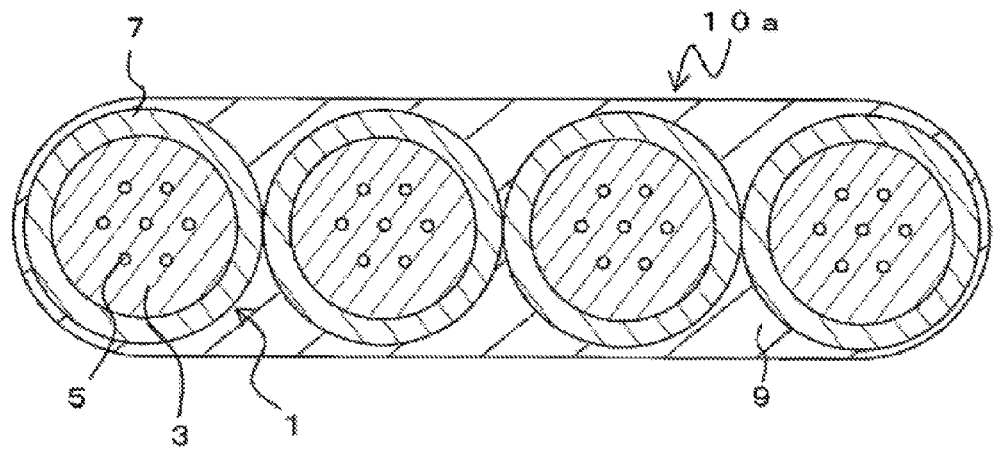
Figure 9B:
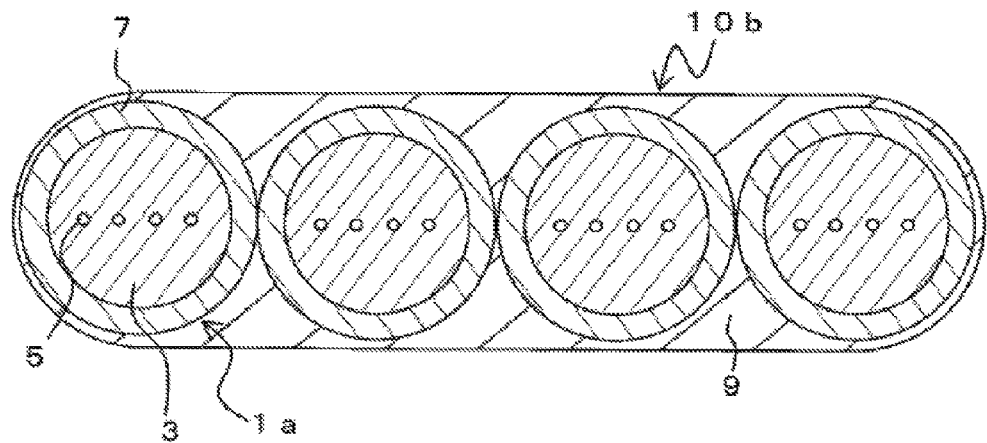
Figure 9C:
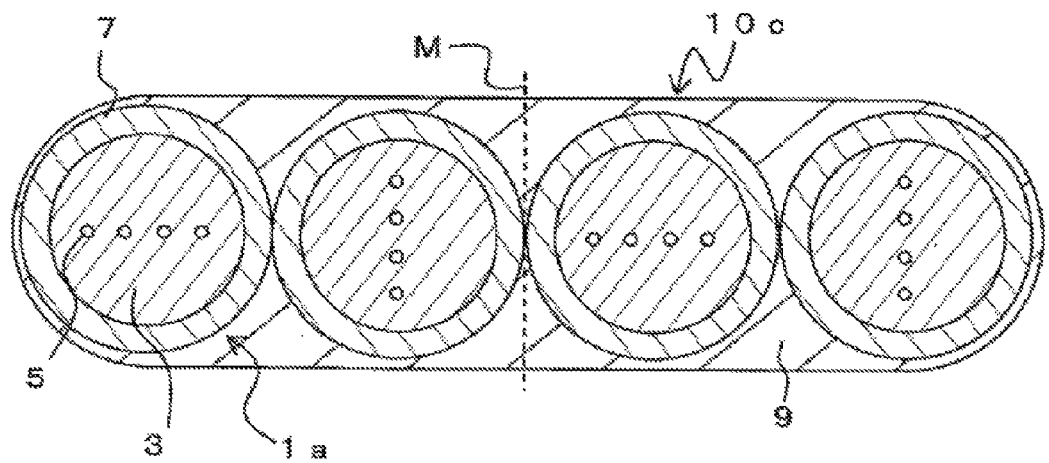

Alternatively, as in an optical fiber ribbon 10c shown in FIG. 9 (c), the orientations of all multi-core fibers forming the optical fiber ribbon 10c may not be the same. In the optical fiber ribbon 10c, the multi-core fibers 1a in which the cores 5 are arranged in the width direction of the optical fiber ribbon 10c and the multi-core fibers 1a in which the cores 5 are arranged in the thickness direction of the optical fiber ribbon 10c are alternately arranged. That is, over the longitudinal direction of the optical fiber ribbon 10c, the multi-core fibers 1a are arranged in such a manner that the cores 5 of some of all the multi-core fibers 1a and the cores 5 of the other multi-core fibers 1a are positioned 90 degrees rotated from each other with the respective longitudinal direction of the multi-core fiber 1a as an axis of rotation.

As above, it is unnecessary that the orientations of multi-core fibers forming an optical fiber ribbon are all the same, and it is only required that the core arrangement of each of the multi-core fibers is substantially uniform at any cross section in the longitudinal direction of the optical fiber ribbon. Moreover, since the optical fiber ribbon 10c shown in FIG. 9 (c) is not symmetrical with the center line of the width direction M as an axis, it is possible to identify the multi-core fibers 1a at the left and the right ends so that the connecting direction for the optical fiber ribbon 10c will not be mistaken.

In the above-mentioned examples, optical fibers forming an optical fiber ribbon are multi-core fibers. However, the contemplated embodiments are not limited thereto. Other than multi-core fibers, it is also applicable to optical fibers of which the form of a cross section perpendicular to the longitudinal direction thereof has an orientation in a rotational direction with the longitudinal direction as an axis.

Figure 10A:
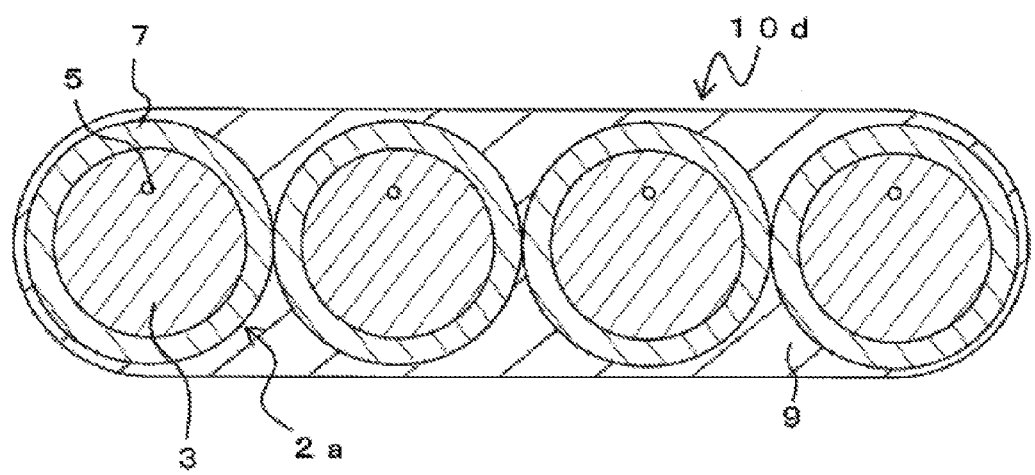
FIG. 10 (a) is a drawing showing an optical fiber ribbon 10d.
Figure 10B:
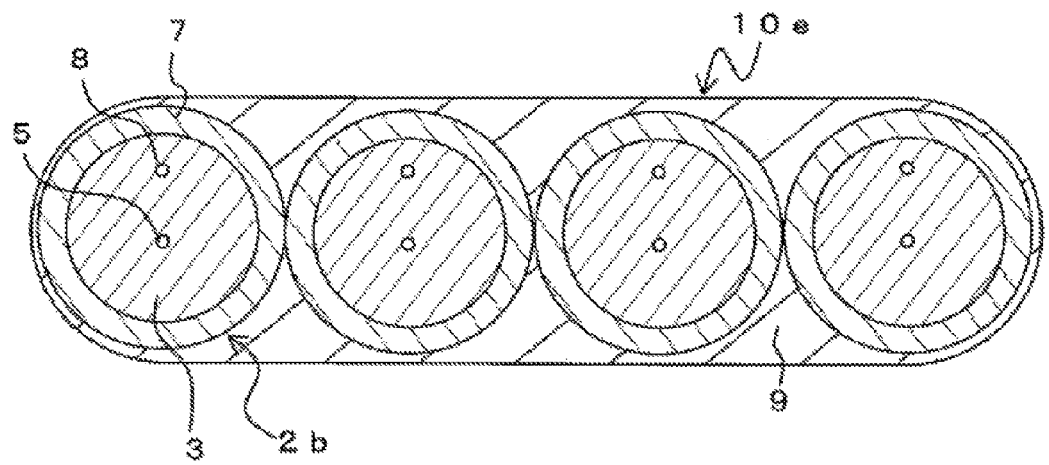
Figure 10C:
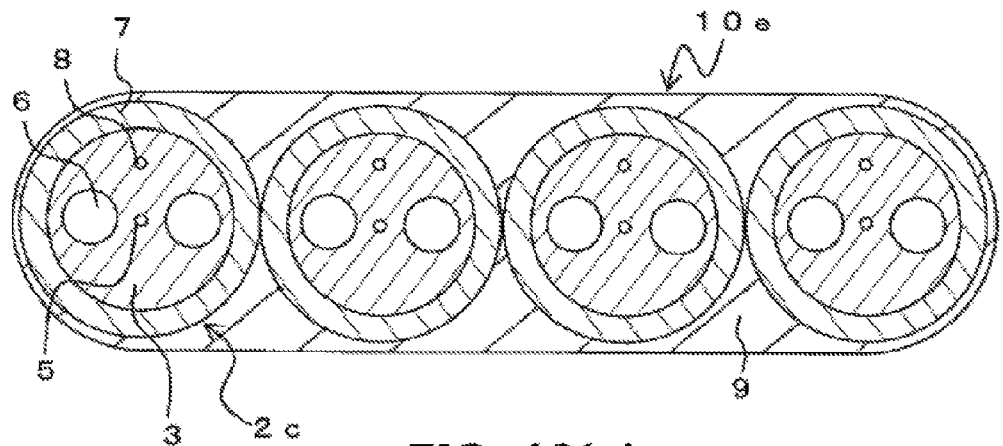

For example, as in an optical fiber ribbon 10d shown in FIG. 10 (a), it is even applicable to a single-core optical fiber 2a in which a core is positioned eccentrically from the center of the optical fiber. By providing a marker 8 in addition to signal light transmission cores, the present embodiments can also be applied to an optical fiber 2b having comparatively smaller eccentricity as in an optical fiber ribbon 10e shown in FIG. 10 (b), to an optical fiber 2c which is a polarization-maintaining fiber having a core 5 at the center and provided with stress applying parts 6 on both sides thereof as in an optical fiber ribbon 10f shown in FIG. 10 (c), or to a flat core fiber. In such cases, light should be introduced into the marker 8. Since the marker 8 of the optical fiber is required to maintain the light for only a predetermined length and is not used for transmitting signal light, it is unnecessary to consider the optical transmission characteristics thereof. Thus, the marker 8 can be made leaky of light compared to the cores and this is particularly ideal for the present embodiment.

As above, according to the present embodiment, in an optical fiber ribbon in which a plurality of optical fibers with cross sections perpendicular to the longitudinal direction thereof having an orientation in the rotational direction with the longitudinal direction thereof as an axis, are provided in parallel, an optical fiber ribbon in which cores of the optical fibers are arranged at fixed positions respectively over the longitudinal direction can be obtained.

Second Embodiment of Other Optical Fiber Ribbons

Figure 11A:
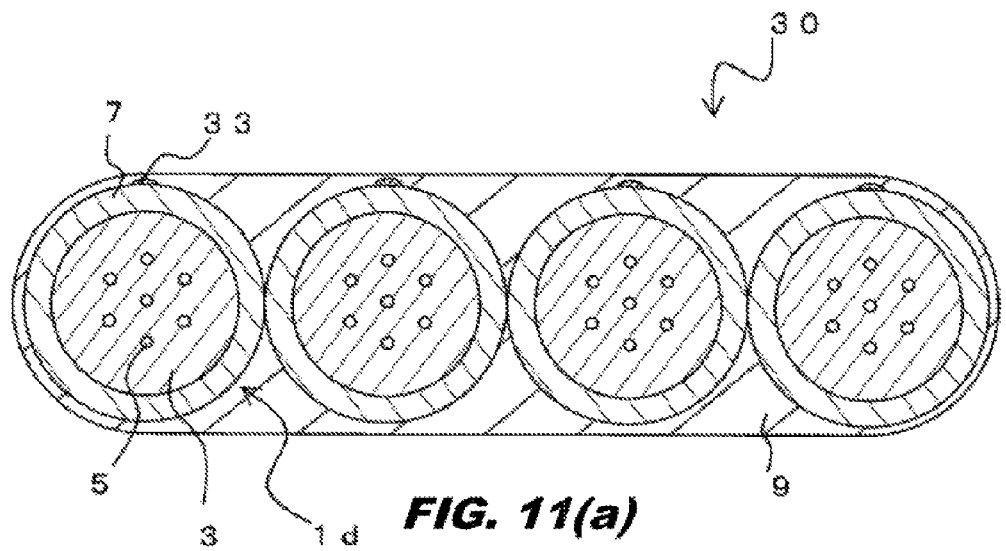
FIG. 11 (a) is a drawing showing an optical fiber ribbon 30.
Figure 11B:
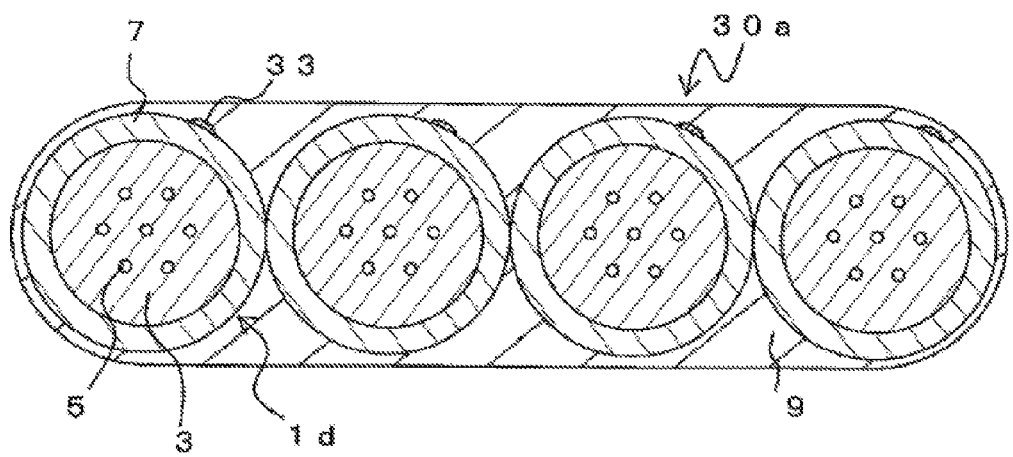

FIG. 11 (a) is a drawing showing an optical fiber ribbon 30. The optical fiber ribbon 30 is approximately similar to the optical fiber ribbon 10 except that a colored portion 33 is provided on a periphery surface of a multi-core fiber 1d. The colored portion 33 is formed on a part of the circumferential direction of an outer surface of the resin coating 7, which is on the periphery of the cladding 3. The colored portion 33 is formed continuously or intermittently along the longitudinal direction of the multi-core fiber 1d.

On the cross section perpendicular to the longitudinal direction of the multi-core fiber 1d, the position of the particular core 5 and the position where the colored portion 33 is formed are substantially fixed along the longitudinal direction of the multi-core fiber 1d. That is, this positional relation is maintained at any positions (any positions within the range in which the colored portions 33 are formed) along the longitudinal direction of the multi-core fiber 1d.

For example, if the colored portion 33 is formed at a position closest to the outermost core (directly above the outermost core), the position of the particular core 5 can be visually recognized easily. That is, the colored portion 33 functions as a marker for recognizing the core position.

The optical fiber ribbon 30 includes a plurality of the multi-core fibers 1d that are arranged in parallel and integrated by the ribbon resin coating 9. The multi-core fibers 1d are disposed in such a manner that, on every cross section perpendicular to the longitudinal direction of the optical fiber ribbon 30, the cores 5 of all the multi-core fibers 1d are all arranged with the same orientation over the longitudinal direction of the optical fiber ribbon 30. For example, in the example shown in the drawing, the multi-core fibers 1d are disposed in such a manner that every one of the center lines of each of the multi-core fibers 1d connecting three of the cores 5 is in the thickness direction of the optical fiber ribbon 30 (the vertical direction in the drawing). Also, in the optical fiber ribbon 30, the cores 5 are arranged at fixed positions over a predetermined range of length (preferably over the entire length) of the longitudinal direction of the optical fiber ribbon 30. That is, the arrangement of the cores 5 is always substantially uniform on any cross section of the optical fiber ribbon 30 in the longitudinal direction thereof.

Alternatively, as in an optical fiber ribbon 30a shown in FIG. 11 (b), one of the center lines of each of the multi-core fiber 1d connecting the three cores 5 may all be rotated for a predetermined angle from the thickness direction of the optical fiber ribbon 30a (the vertical direction in the drawing). Or, the orientation of each of the multi-core fibers 1d may not all be the same. For example, the multi-core fibers 1d may be arranged in such a manner that the cores 5 of some of all the multi-core fibers 1d and the cores 5 of the other multi-core fibers 1d are positioned 90 degrees rotated from each other with the respective longitudinal direction of the multi-core fiber 1d as an axis of rotation. In either case, it is only required that the arrangement of the cores 5 is always substantially uniform on any cross section in the longitudinal direction of the optical fiber ribbon 30.

Figure 12:
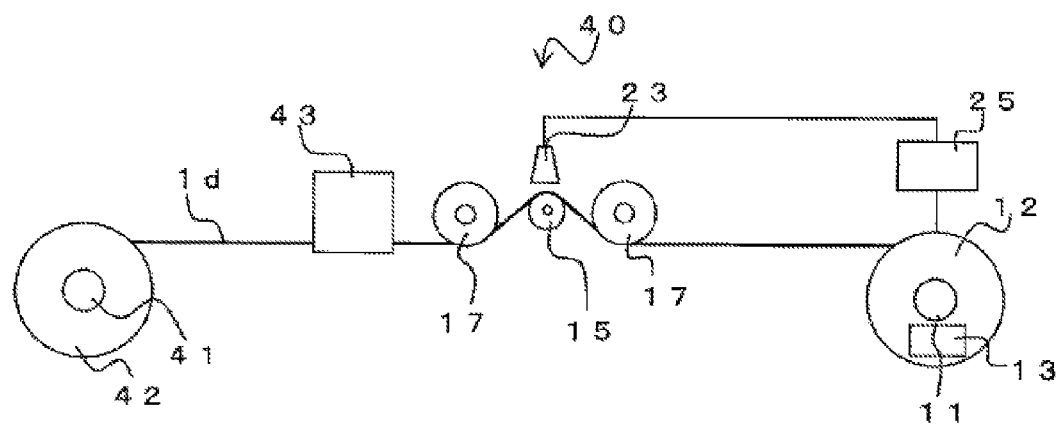
FIG. 12 is a side view showing a colored resin applying apparatus 40.

Next, a method for producing the multi-core fiber 1d will be described. FIG. 12 is a drawing showing a colored resin applying apparatus 40. The colored resin applying apparatus 40 mainly includes the bobbin mounting parts 11 and 41, bobbin controller 25, the guides 17, the optical fiber bending part 15, the optical detector 23, a resin applying part 43, and so on.

The multi-core fiber 1d before coloring is wound around the bobbin 12, which is disposed on the bobbin mounting part 11, and the multi-core fiber 1d is reeled out from the bobbin 12. The light introducing part 13 is provided on the bobbin mounting part 11.

The multi-core fiber 1d reeled out from the bobbin 12 is sent to the optical fiber bending part 15 disposed between a pair of the guides 17. The optical fiber bending part 15 is a roller and bends the multi-core fiber 1d contacting and passing the roller to have a predetermined curvature. In the proximity of the optical fiber bending part 15, the optical detector 23 is disposed. The intensity of the leaked light detected by the optical detector 23 is sent to the bobbin controller 25. The bobbin controller 25 controls the posture of the bobbin 12 as mentioned above.

The multi-core fiber 1d that has passed the optical fiber bending part 15 then passes through the resin applying part 43. At the resin applying part 43, a colored resin is applied to a predetermined position of the periphery surface of the resin coating 7 of the multi-core fiber 1d. The resin applying part 43 can apply the colored resin continuously or intermittently over the entire length of the multi-core fiber 1d by, for example, contacting a roller holding the colored resin with the periphery surface of the multi-core fiber 1d. The colored resin may be in any color as long as it is recognizable from the resin coating 7.

The colored resin applied at the resin applying part 43 is then cured by drying or UV radiation, if necessary, to form the colored portion 33. The multi-core fiber 1d formed with the colored portion 33 is wound up by the winding-up bobbin 42 disposed on the bobbin mounting part 41. In this way, the multi-core fiber 1d including the colored portion 33 is produced.

At the resin applying part 43, the colored resin is applied continuously or intermittently along its longitudinal direction on the predetermined position of the circumferential direction of the multi-core fiber 1d. Thus, controlling the particular core (the light introducing core 5a) to be always at a predetermined position of the circumferential direction on the cross section perpendicular to the longitudinal direction of the multi-core fiber 1d can make the positional relation of the colored portion 33 and the particular core substantially uniform along the longitudinal direction of the multi-core fiber 1d.

For example, if the colored resin is applied from the upper part of the multi-core fiber 1d, the colored portion 33 can be formed directly above the above-mentioned light introducing core 5a (the particular outermost core). That is, if the particular core is the outermost core that is closest to the periphery part of the cladding on the cross section perpendicular to the longitudinal direction of the multi-core fiber, the colored portion 33 can be formed on a position of the circumferential direction of the outer surface of the resin coating that is closest to the outermost core. This makes it possible to visually recognize the position of the particular core easily from the outer surface of the multi-core fiber 1d.

Figure 13:
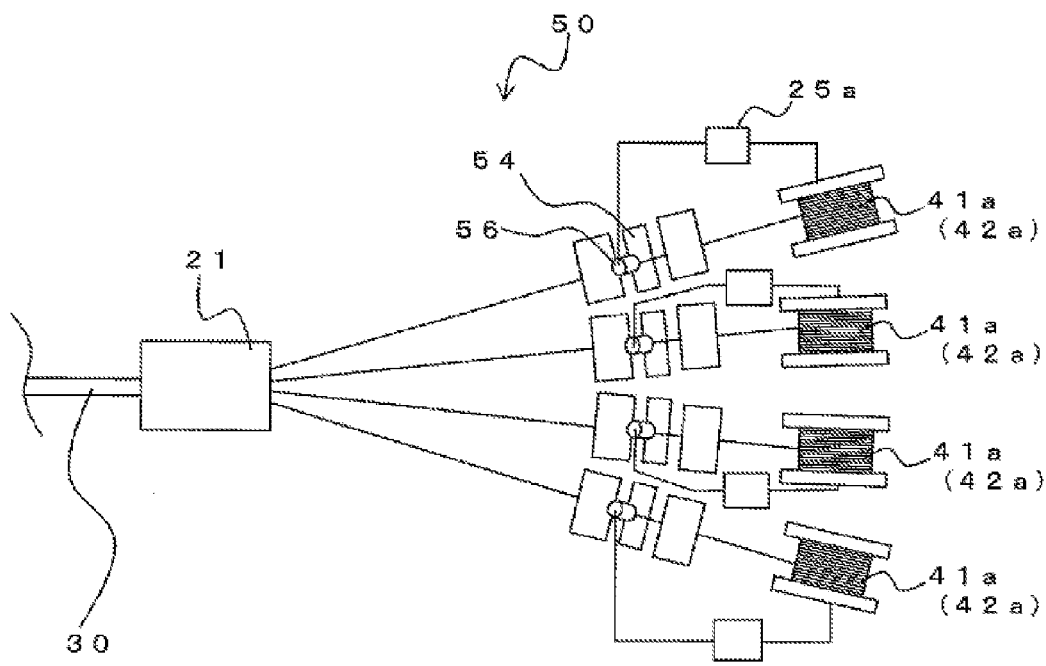
FIG. 13 is a drawing showing an optical fiber ribbon producing apparatus 50.

Next, a method for producing an optical fiber ribbon using the obtained multi-core fiber 1d will be described. FIG. 13 is a plan view showing an optical fiber ribbon producing apparatus 50 for producing the optical fiber ribbon 30. The optical fiber ribbon producing apparatus 50 mainly includes bobbin mounting parts 41a, bobbin controllers 25a, guides 54, guides 54, colored portion detectors 56, the ribbon resin coater 21, and so on. The number of the bobbin mounting parts 41a, bobbin controllers 25a, guides 54, and the colored portion detectors 56 disposed is equal to the number of the multi-core fibers 1 forming the optical fiber ribbon 30.

The bobbin 42a is disposed on the bobbin mounting part 41a. The multi-core fiber formed with the above-mentioned colored portion 33 is wound around the bobbin 42a, which reels out the multi-core fiber 1.

Each of the multi-core fibers 1d reeled out from the bobbin 42a is sent to the guide 54. The guide 54 is a roller that leads the multi-core fiber 1d to a predetermined position. For example, a V-shaped groove is provided on the guide 54 so as to lead the multi-core fiber 1d to always pass through a fixed position.

The colored portion detector 56 is disposed in the proximity of each of the guides 54. The colored portion detector 56 is a sensor that takes images of the surface of the multi-core fiber 1d and continuously detects the position of the colored portion 33. The colored portion detector 56 is, for example, a CCD camera. The positions of the colored portions 33 detected by the colored portion detectors 56 are sent to the respective bobbin controller 25a.

The bobbin controller 25a controls the posture of the bobbin 42a so that the colored portion 33 is always at a fixed position. In specific, when it is found out that the colored portion 33 is shifted from the center of the image of the multi-core fiber 1d, the bobbin controller 25a tilts the bobbin 42a so as to move the colored portion 33 to the direction opposite to the shifting. In this way, the multi-core fiber 1d can be sent to the ribbon resin coater 21 with the colored portion 33 always oriented to the fixed direction. The tilting of the bobbin 42a by the bobbin controller 25a is similar to the tilting of the bobbin 12 by the bobbin controller 25 described above.

The multi-core fibers 1d all aligned with the same orientation pass through the ribbon resin coater 21. At the ribbon resin coater 21, a plurality of the multi-core fibers 1d are aligned and ribbon resin coating is applied to the periphery part thereof. The ribbon resin coater 21 is, for example, an extruding machine including alignment dies or extrusion dies.

The ribbon resin coating applied by the ribbon resin coater 21 is cured by drying or UV radiation as necessary. The optical fiber ribbon 30, in which a plurality of the multi-core fibers 1d are integrated is wound up by a winding apparatus whose drawing is omitted. As above, the optical fiber ribbon 30 is produced.

By recognizing the positions of the colored portions 33 with sensors or the like and then rotating and aligning the multi-core fibers 1d, the optical fiber ribbon 30 in which the core arrangement is uniform over the longitudinal direction can be obtained.

Third Embodiment of Other Optical Fiber Ribbons

Figure 14:
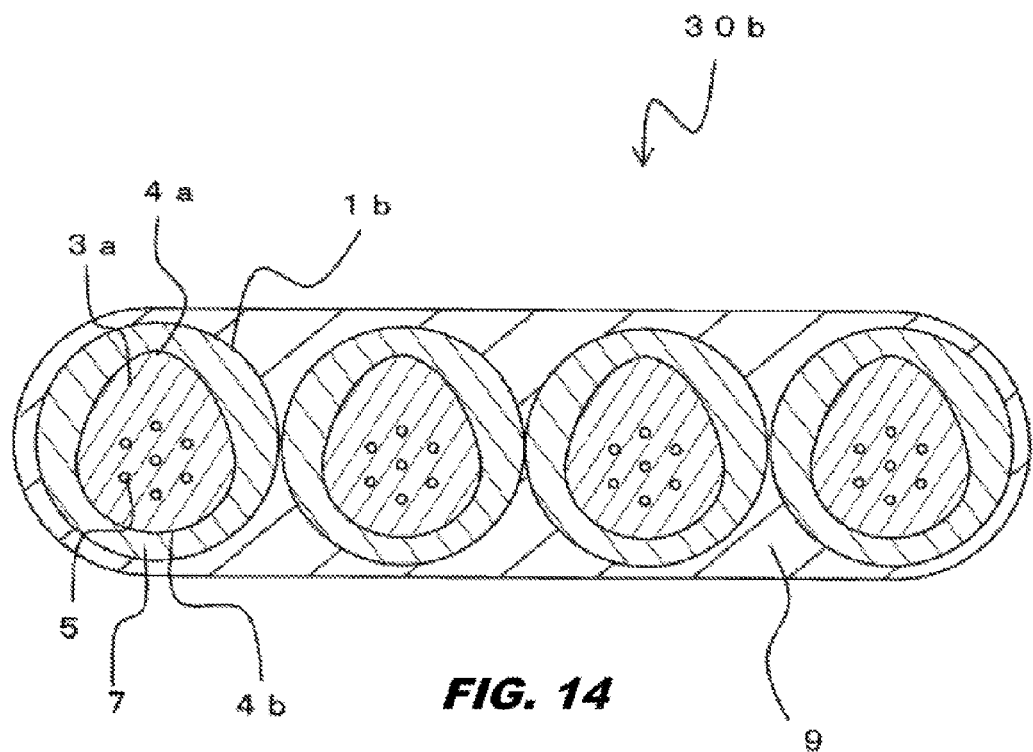
FIG. 14 is a drawing showing an optical fiber ribbon 30b.

FIG. 14 is a cross sectional view showing an optical fiber ribbon 30b including multi-core fibers 1b. The multi-core fiber 1b is approximately similar to the multi-core fiber 1 except that the cladding 3a is substantially drop shaped. That is, the cladding 3a is non-perfect circular shaped. The cross section of the outer shape of the resin coating 7 is in a substantially perfect circular shape. Also, the center of the resin coating 7 substantially coincides with the center of the cladding 3a.

Here, the drop shape is defined as a shape in which its entire circumference is formed as a continuous arc, which has a long axis and a short axis intersecting with each other like an ellipse and is substantially symmetrical with the long axis as an axis of symmetry, and in which the radius of curvature of an arc at one end of the long axis is different from that of an arc at the other opposite end. In the example shown in the drawing, the arc at the upper part of the center line in the long axis direction is a small-diameter section 4a and the arc at the lower part is a large-diameter section 4b, which has a larger radius of curvature than the small-diameter section 4a.

In the multi-core fiber 1b, like in the multi-core fiber 1, the center of the cladding 3a of the multi-core fiber 1b (an intersection of the center line in the long axis direction and the center line in the short axis direction) and the center of the core group (hereinafter, a plurality of the cores 5 will be regarded as the core group in a lump) are shifted from each other. Here, the center line in the short axis direction of the cladding 3a is a line that intersects with the center line in the long axis direction at right angles and passes through a position which is half way from the ends of the length of the cladding 3a in the long axis direction on the center line in the long axis direction (the maximum length).

As above, the core group is arranged eccentric to the cladding 3a. Preferably, the direction of eccentricity of the core group is in the long axis direction and is on the side of the large-diameter section 4b having a larger radius of curvature. In such a case, the center line of the cladding 3a in the long axis direction and the center line of the core group in the same direction are common.

Figure 15:
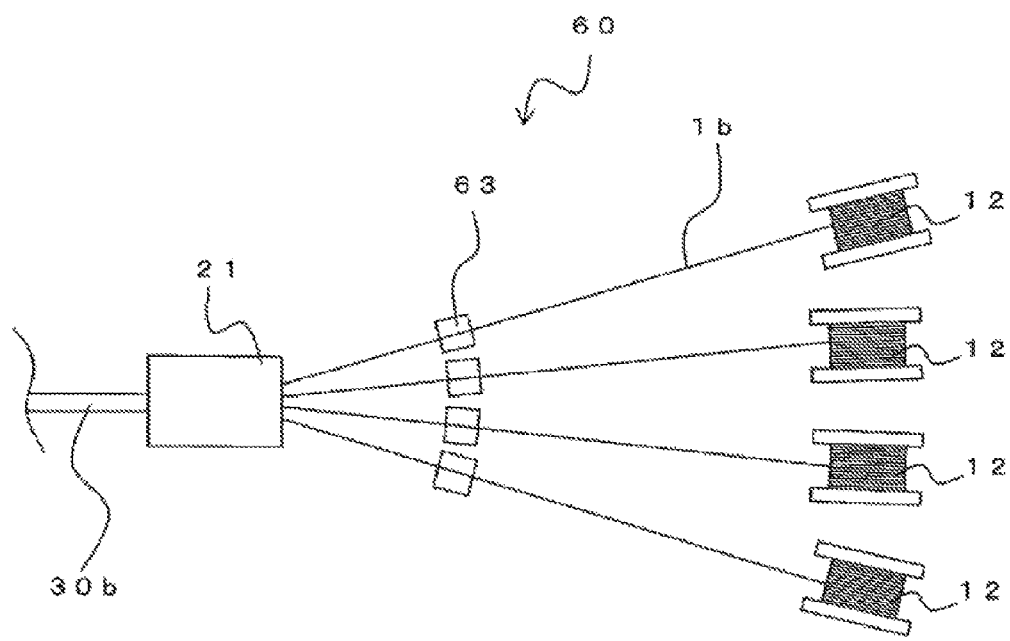
FIG. 15 is a plan view showing an optical fiber ribbon producing apparatus 60.
Figure 16:
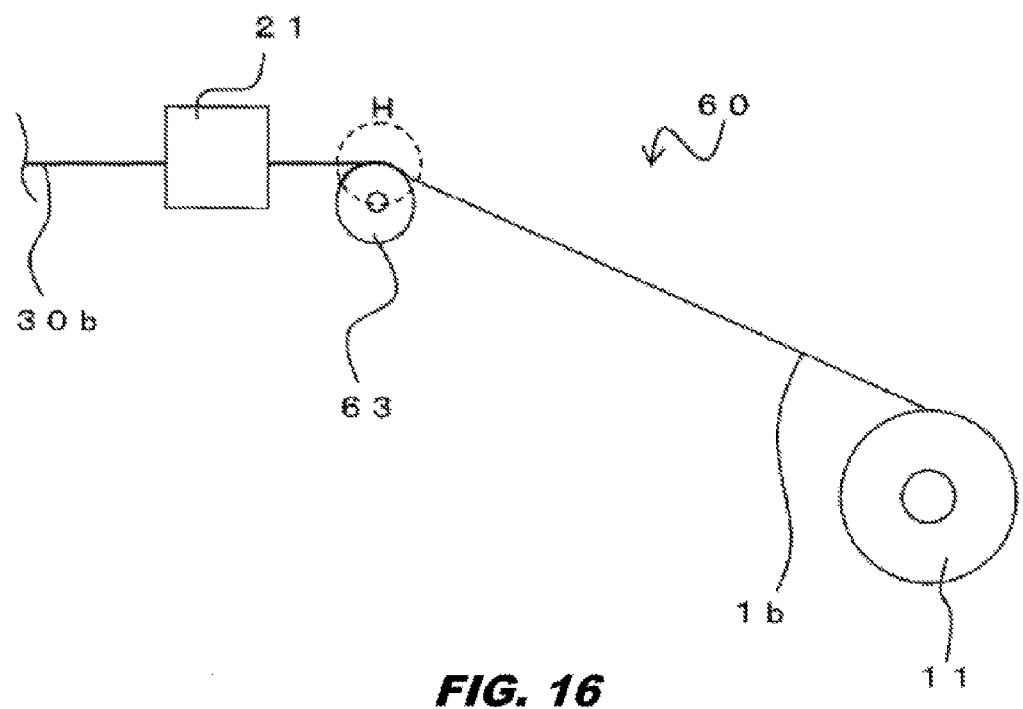
FIG. 16 is a side view showing the optical fiber ribbon producing apparatus 60.

Next, a method for producing an optical fiber ribbon using the multi-core fibers 1b will be described. FIG. 15 is a schematic plan view showing an optical fiber ribbon producing apparatus 60 and FIG. 16 is a schematic side view showing the optical fiber ribbon producing apparatus 60. The optical fiber ribbon producing apparatus 60 includes rollers 63, the ribbon resin coater 21, and so on. Although the example shown in the drawings illustrates an example in which the four multi-core fibers 1b are made into a ribbon, the number of the multi-core fibers 1b does not matter.

The multi-core fibers 1b reeled out from the bobbins 12 are sent to the rollers 63 respectively. The multi-core fiber 1b contacts the roller 63 in a state being applied with a predetermined tension and bends.

Figure 17:
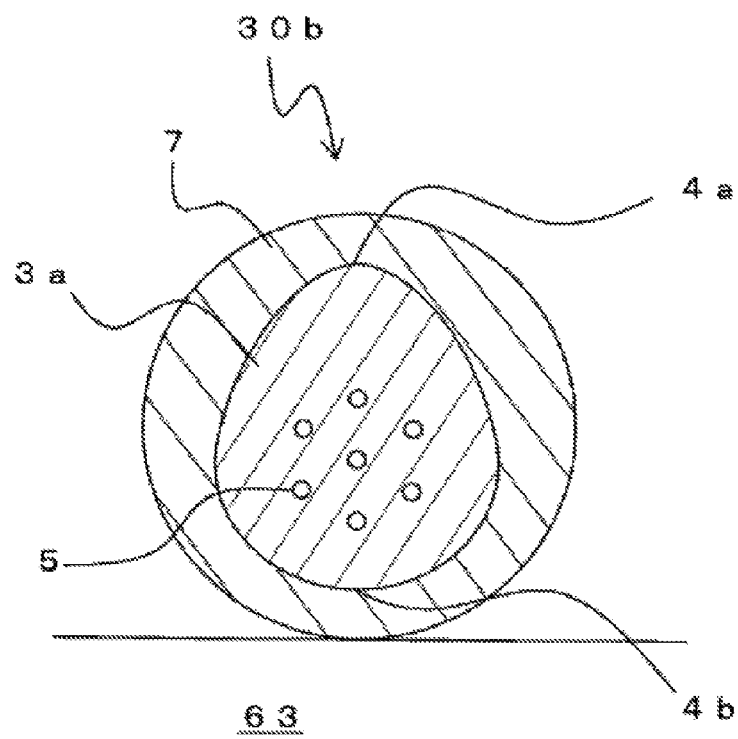
FIG. 17 is a partial cross sectional view of H section in FIG. 16.

FIG. 17 is a partial cross sectional view of H section in FIG. 16. As shown in FIG. 11, when the multi-core fiber 1b is brought into contact with the roller 63 in a state being applied with the predetermined tension to be bent, the multi-core fiber 1b rotates itself so as to be in a more stable rotational direction. In specific, the multi-core fiber 1b rotates so that the centroid position of the cladding 3a (the large-diameter section 4b) comes to the side of the roller 63 (inner periphery side of the bending portion). The reason for this may be considered as that the large-diameter section 4b side has less amount of resin coating 7, which is lightweight and easy-to-stretch, compared to the small-diameter section 4a side, and thus the easily deformable small-diameter section 4a comes to the outer periphery side and the large-diameter section 4b, which is closer to the centroid and is not easily transformable, is pressed against the roller 63.

More specifically, on a cross section perpendicular to the longitudinal direction of the multi-core fiber 1b, when the cross section of the multi-core fiber 1b is divided into two regions by the center line of the resin coating 7 that intersects with the long axis of the cladding 3a at right angles and the proportions of cladding 3a occupying in each of the regions on the cross section of the multi-core fiber 1b are compared, the occupying proportion of the cladding 3a is greater on the large-diameter section 4b side than the small-diameter section 4a side and the occupying proportion of the resin coating 7 is greater on the small-diameter section 4a side than the large-diameter section 4b side. Here, in a case in which the cross section of the multi-core fiber 1b is divided into regions by a predetermined center line, the direction in which the proportion of the cladding 3a is maximum is likely to stabilize on the roller 63 side. Thus, the multi-core fiber 1b rotates in the direction so as to press the large-diameter section 4b side against the roller 63 side.

As above, the each of the multi-core fibers 1b contacts the roller 63 and is aligned in more stable orientation thereby, so that the multi-core fibers 1b that are all aligned in one fixed orientation pass through the ribbon resin coater 21. At the ribbon resin coater 21, a plurality of the multi-core fibers 1b are aligned and a ribbon resin coating is applied to the outer periphery part thereof. The ribbon resin coater 21 is, for example, an extruding machine including alignment dies or extrusion dies.

The ribbon resin coating applied by the ribbon resin coater 21 is cured by drying or UV radiation as necessary. The optical fiber ribbon 30b, in which a plurality of the multi-core fibers 1b are integrated, is wound up by a winding apparatus whose drawing is omitted. As above, the optical fiber ribbon 30b is produced.

In the optical fiber ribbon 30b produced in this way, the multi-core fibers 1b are arranged in such a manner that the claddings 3a of all the multi-core fibers 1b point toward the same direction on a cross section perpendicular to the longitudinal direction of the optical fiber ribbon 30b. In specific, the multi-core fibers 1b are arranged so that the large-diameter section 4b of the cladding 3a are aligned on the same surface direction of the optical fiber ribbon 30b.

Consequently, the multi-core fibers 1b are arranged so that the arrangements of the cores 5 of all the multi-core fibers 1b are all in the same orientation. For example, in the example shown in the drawing, the multi-core fibers 1 are disposed in such a manner that every one of the center lines of each of the multi-core fibers 1b connecting three of the cores 5 is in the thickness direction of the optical fiber ribbon 30b (the vertical direction in the drawing). Also, in the optical fiber ribbon 30b, the cores 5 are arranged at substantially fixed positions over a predetermined range of length (preferably over the entire length) in the longitudinal direction of the optical fiber ribbon 30b. That is, the arrangement of the cores 5 is substantially uniform on any cross section of the optical fiber ribbon 30b in the longitudinal direction thereof.

Fourth Embodiment of Other Optical Fiber Ribbons

Figure 18:
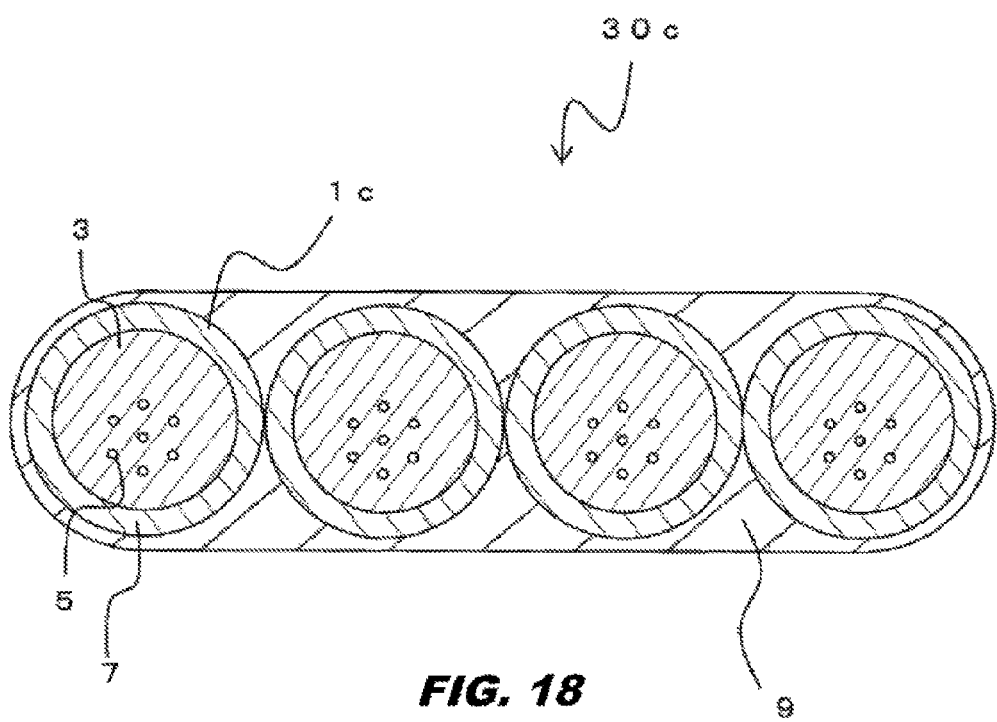
FIG. 18 is a drawing showing an optical fiber ribbon 30c.

FIG. 18 is a cross sectional view of an optical fiber ribbon 30c using multi-core fibers 1c. In the multi-core fiber 1c, the center position of the cladding 3 substantially coincides with the center position of the resin coating 7 on a cross section perpendicular to the longitudinal direction of the multi-core fiber 1c. On the other hand, the center position of the multi-core fiber 1c is at a different position from the center position of the core group on a cross section perpendicular to the longitudinal direction of the multi-core fiber 1c.

The optical fiber ribbon 30c is produced by aligning the orientations of all the multi-core fibers 1c while viewing the end face of the multi-core fibers 1c from the side to observe the positions of the cores 5 and then providing a coating resin on the periphery thereof. In this way, the multi-core fibers 1 can be arranged in such a manner that the claddings 3 of all the multi-core fibers 1c point toward the same direction on a cross section perpendicular to the longitudinal direction of the optical fiber ribbon 30c.

Although the embodiments have been described referring to the attached drawings, the technical scope is not limited to the embodiments described above. It is obvious that persons skilled in the art can think out various examples of changes or modifications within the scope of the technical idea recited in the claims, and it will be understood that they naturally belong to the technical scope of the present disclosure.

For example, needless to say, each of the embodiments can be combined with each other.

What is claimed is:

1. A method of producing an optical fiber ribbon including a plurality of optical fibers arranged in parallel, wherein:
   a form of a cross section of each of the optical fibers taken in a perpendicular direction to a longitudinal direction thereof has an orientation in a rotational direction with the longitudinal direction of the optical fiber as an axis, the method including:
   a light introducing step which introduces light into a core of each of the optical fibers;
   a light leaking step which leaks the light introduced into the core to the outside of each of the optical fibers;
   a light detecting step which detects the light of each of the optical fibers leaked in the light leaking step;
   an optical-fiber rotating step which rotates each of the optical fibers in a circumferential direction thereof so as to maintain the leaked light detected in the light detecting step to be substantially constant among the plurality of optical fibers; and
   a coating step which coats the optical fibers together to make the optical fiber ribbon.

2. The method of producing an optical fiber ribbon according to claim 1, wherein the light is introduced from a bent portion of each of the bent optical fibers in the light introducing step.

3. The method of producing an optical fiber ribbon according to claim 1, wherein the light is introduced from an end of each of the optical fibers in the light introducing step.

4. The method of producing an optical fiber ribbon according to claim 1, wherein the optical-fiber rotating step rotates each of the optical fibers in the circumferential direction thereof by tilting a rotational surface of a bobbin that reels out the optical fiber.

5. The method of producing an optical fiber ribbon according to claim 1, wherein the optical-fiber rotating step rotates each of the optical fibers in the circumferential direction thereof by tilting a rotational surface of a roller which is disposed either in front or rear of a detector that detects leak of the light in the light detecting step.

6. The method of producing an optical fiber ribbon according to claim 1, wherein the optical fiber has a circular cross section.

7. The method of producing an optical fiber ribbon according to claim 1, wherein the optical fiber is a multi-core fiber having a plurality of cores.

* * * * *